Dec. 30, 1952 T. A. HANSEN 2,623,948

MULTIPLEX TELEGRAPH RECEIVER EMPLOYING AN ELECTRONIC DISTRIBUTOR

Original Filed May 28, 1945 8 Sheets-Sheet 1

FIG. I

INVENTOR
THEODORE A. HANSEN
BY Emery Robinson
ATTORNEY

INVENTOR
THEODORE A. HANSEN
BY Emery Robinson
ATTORNEY

Dec. 30, 1952 T. A. HANSEN 2,623,948

MULTIPLEX TELEGRAPH RECEIVER EMPLOYING AN ELECTRONIC DISTRIBUTOR

Original Filed May 28, 1945 8 Sheets-Sheet 3

INVENTOR
THEODORE A. HANSEN
BY Emery Robinson
ATTORNEY

Dec. 30, 1952

T. A. HANSEN

MULTIPLEX TELEGRAPH RECEIVER EMPLOYING
AN ELECTRONIC DISTRIBUTOR 2,623,948

Original Filed May 28, 1945

8 Sheets-Sheet 4

INVENTOR
THEODORE A. HANSEN

BY Emery Robinson
ATTORNEY

Dec. 30, 1952 T. A. HANSEN 2,623,948

MULTIPLEX TELEGRAPH RECEIVER EMPLOYING AN ELECTRONIC DISTRIBUTOR

Original Filed May 28, 1945 8 Sheets-Sheet 5

INVENTOR
THEODORE A. HANSEN
BY Emery Robinson
ATTORNEY

INVENTOR
THEODORE A. HANSEN
BY Emery Robinson
ATTORNEY

INVENTOR
THEODORE A. HANSEN
BY Emery Robinson
ATTORNEY

Dec. 30, 1952 T. A. HANSEN 2,623,948

MULTIPLEX TELEGRAPH RECEIVER EMPLOYING AN ELECTRONIC DISTRIBUTOR

Original Filed May 28, 1945 8 Sheets-Sheet 8

INVENTOR
THEODORE A. HANSEN
BY Emery Robinson
ATTORNEY

Patented Dec. 30, 1952 2,623,948

UNITED STATES PATENT OFFICE 2,623,948

MULTIPLEX TELEGRAPH RECEIVER EMPLOYING AN ELECTRONIC DISTRIBUTOR

Theodore A. Hansen, Park Ridge, Ill., assignor to Teletype Corporation, Chicago, Ill., a corporation of Delaware Original application May 28, 1945, Serial No. 596,295. Divided and this application December 15, 1948, Serial No. 65,438

5 Claims. (Cl. 178—50)

The present invention pertains to telegraph apparatus, and more particularly to receiving apparatus for use in multiplex systems.

This application is a division of copending application Serial No. 596,295, filed on May 28, 1945.

In present multiplex telegraph systems, and apparatus utilized therein, mechanical means are utilized for the transmission and reception of the intelligence signals. While these systems operate satisfactorily there is a maximum speed at which they will operate which is relatively low. At the present time, with the trend toward higher speed operation, it becomes necessary to provide apparatus and systems which will operate at greater speeds and which will not have a limiting maximum speed that is relatively low.

Accordingly, a primary objective of this invention is to provide high speed apparatus for use in a multiplex telegraph system.

A further object is to provide electronic apparatus for achieving such speed.

Another object of the invention is to provide telegraph receiving apparatus utilizing electronic components.

Yet another object of the invention is to eliminate as fully as possible all mechanical and moving parts and to substitute therefor inertialess members of the tube variety.

A still further object of the invention is to provide an electronic distributor in the receiving apparatus.

Another object of the invention is to provide an electronic distributor which may be added as units to electronic receiving equipment whereby the operating speed in the system may be increased.

A still further object of the invention is to provide electronic receiving apparatus which may be easily oriented and phased in the operating system.

In general, the system contemplates apparatus at both the transmitting and receiving stations comprising, as fully as possible, electronic apparatus. The transmitting station utilizes a standard frequency generator to initiate voltage impulses which are presented to the tubes of a pulse generator which amplify and rectify the voltage and impress it on the control grid of the tubes of an electronic distributor. The electronic distributor is so constructed that its tubes operate or fire successively, only one tube being operative at one time. The output of the distributor controls a series of secondary tubes which are conjointly under the control of a tape transmitter. The secondary tubes, each under the joint control of a distributor tube and the tape transmitter, cause impulses to be presented to a transmitting relay tube from whence they are transmitted over a signaling channel. A tube is provided to cause the tape transmitter to step the tape after the code-signal is transmitted.

The receiving station comprises a standard frequency generating apparatus and a pulse generator controlling a distributor in a manner similar to that mentioned above. A series of selector tubes are provided which are under the joint control of the distributor and the incoming code signals. The selector tubes control the code magnets of a multiplex printer or the magnets of an extension arm system for converting multiplex to start-stop code signals. Sixth pulse control tubes are provided which are under the control of the distributor and which control the printing operation of the printer and are utilized to extinguish any of the selector tubes which may have been operated. The receiving station is also provided with a corrector network and a phase shift network in order to synchronize and phase the receiving apparatus with respect to the transmitting apparatus.

The general description immediately above has referred to a single tape transmitter, printer, etc. However, such description is for the sake of clarity, and as the present system is for multiplex operation it contemplates the use of a plurality of tape transmitters at the transmitting station, two of which are shown, with the necessary number of tubes in the distributor and in the secondary series of tubes. Likewise, the receiving station must also be provided with the necessary number of tubes, both distributor and selector, to accommodate a plurality of channels of operation. For illustration purposes the receiving station has been shown as having a multiplex printer and an extension arm apparatus connected to a start-stop printer with one channel of intelligence going to each of these printers.

Overlap is provided for in the present invention as the tubes for controlling the tape feed and printing operations operate only when the apparatus is transmitting or receiving signals over the other multiplex channel.

It might be well to note at this time that the tubes utilized in the distributors at both stations are of the 2050 type, better known as "thyratron" tubes.

A more detailed understanding of the invention may be had from the following description with reference to the accompanying drawings, in which.

Figures 2, 3:
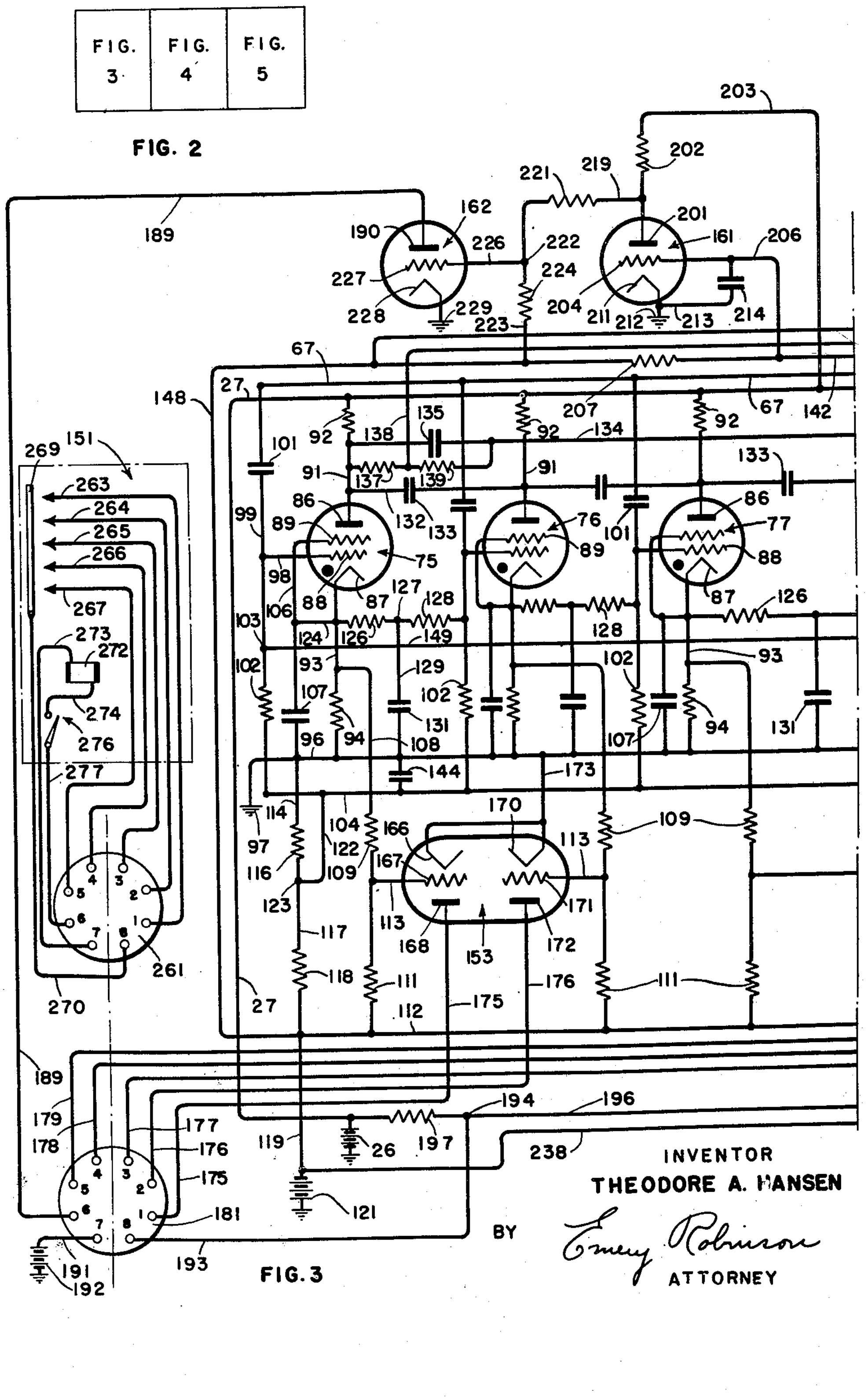
Fig. 2 shows a relative arrangement of the views disclosing the transmitting station.
Figure 4:
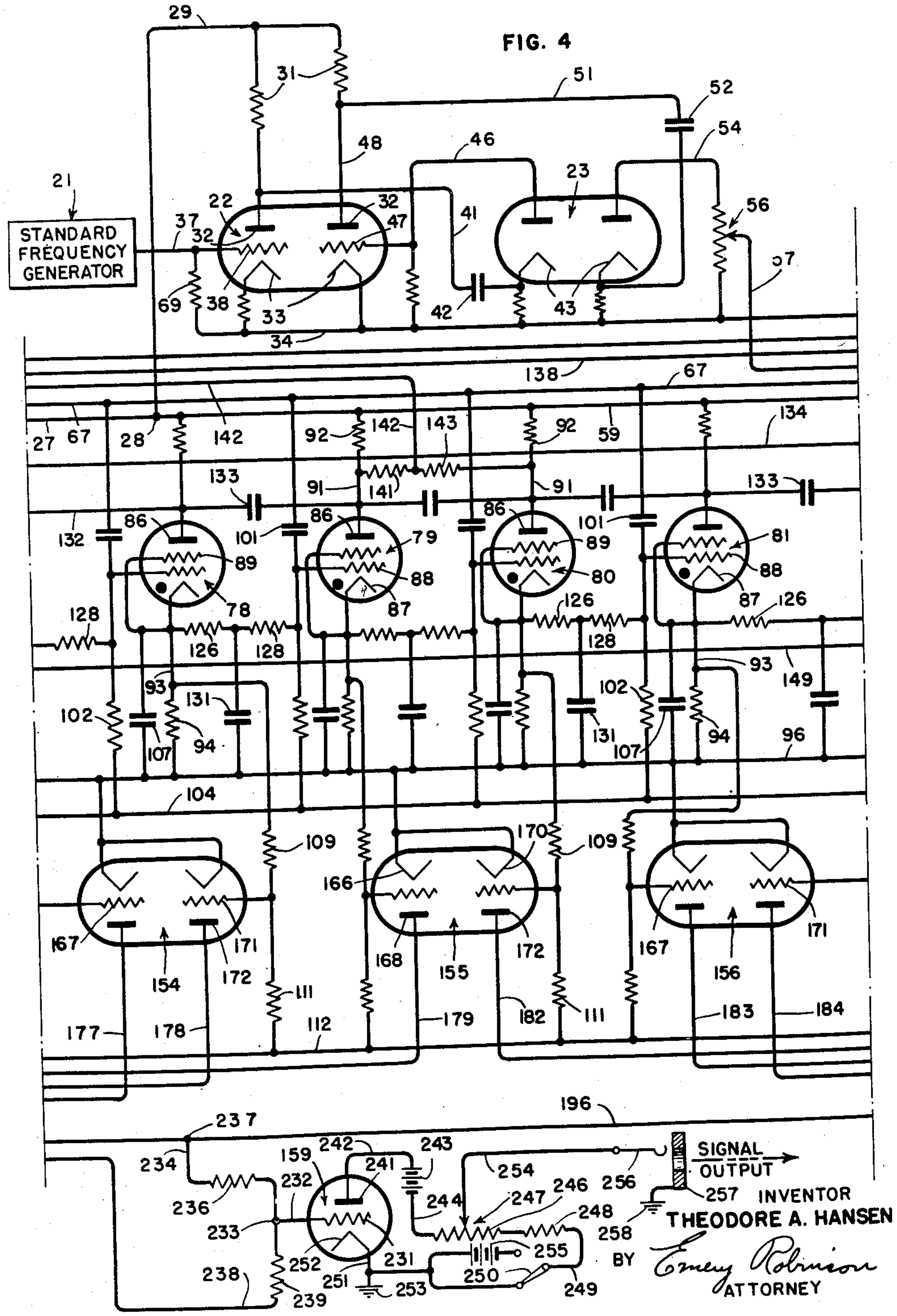
Figure 5:
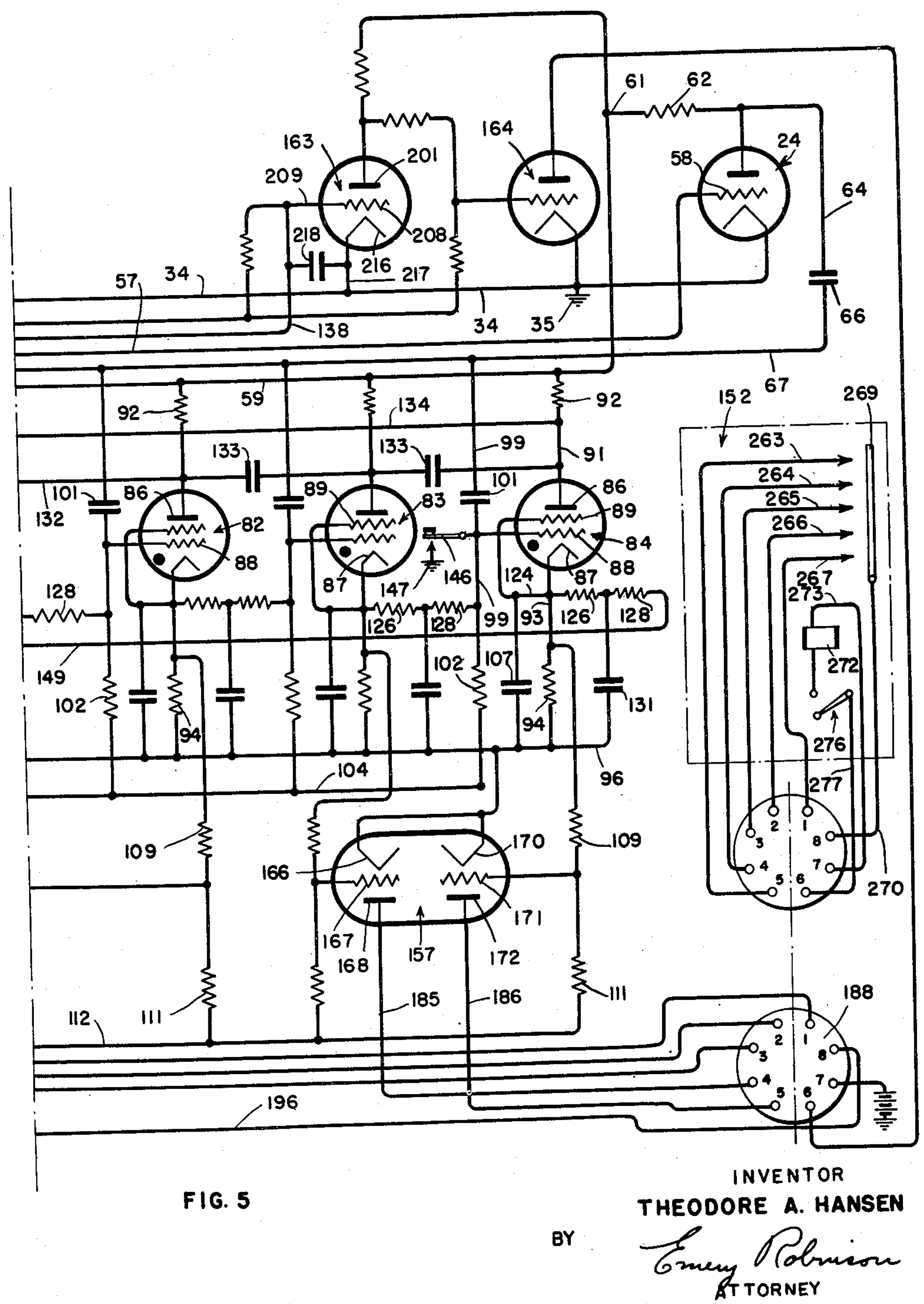
Figures 6, 7:
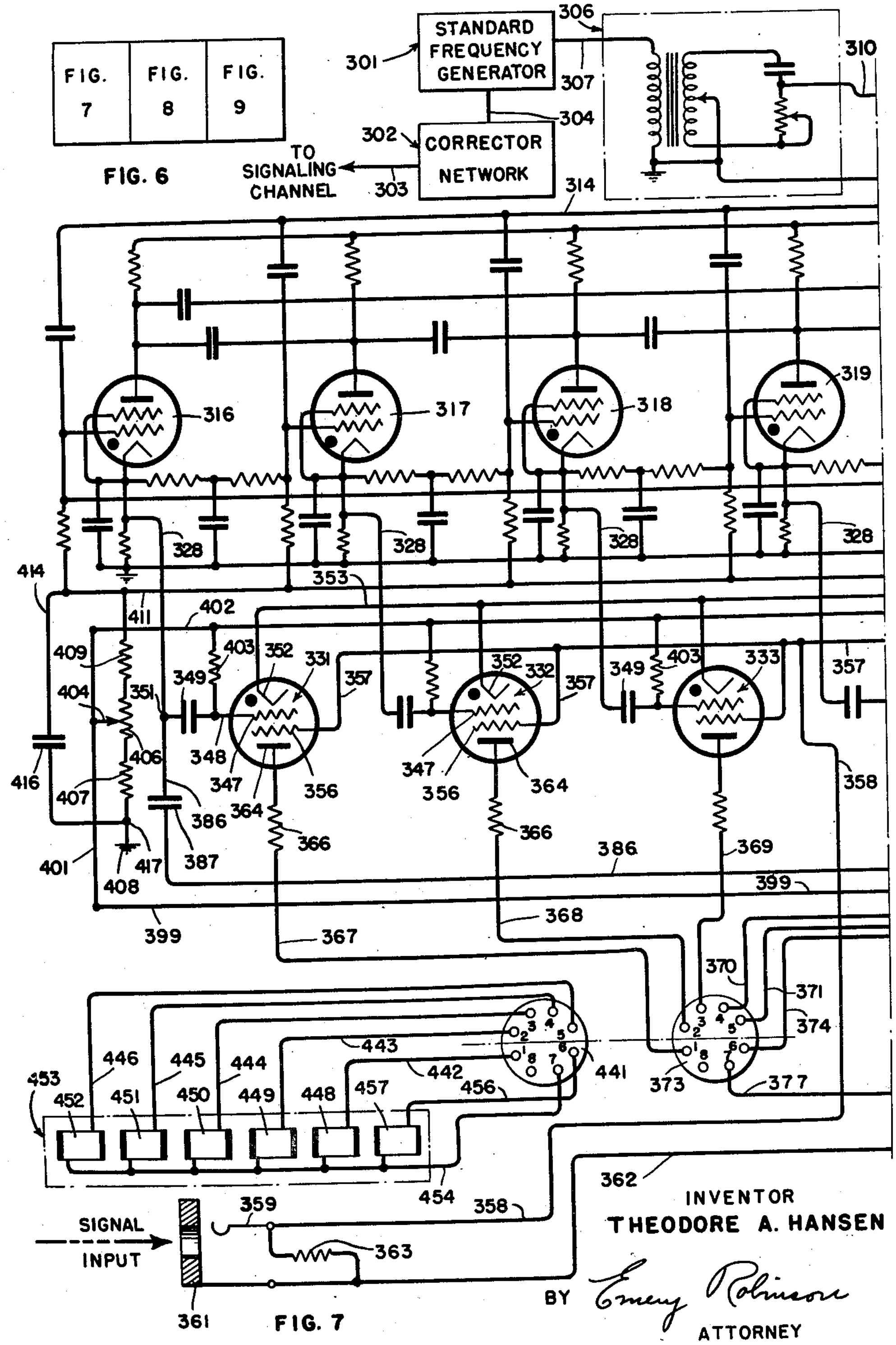
Figure 8:
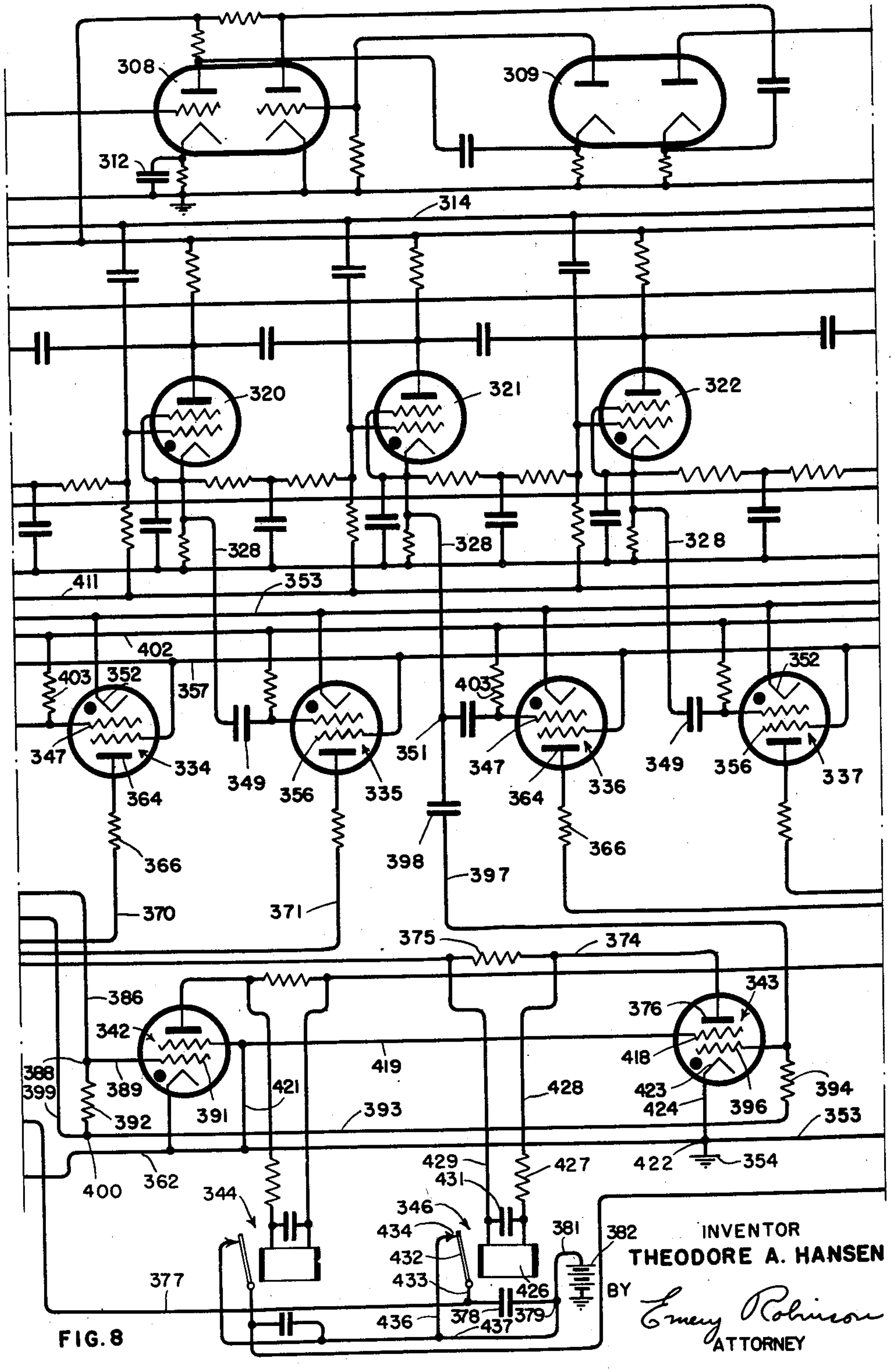
Figure 9:
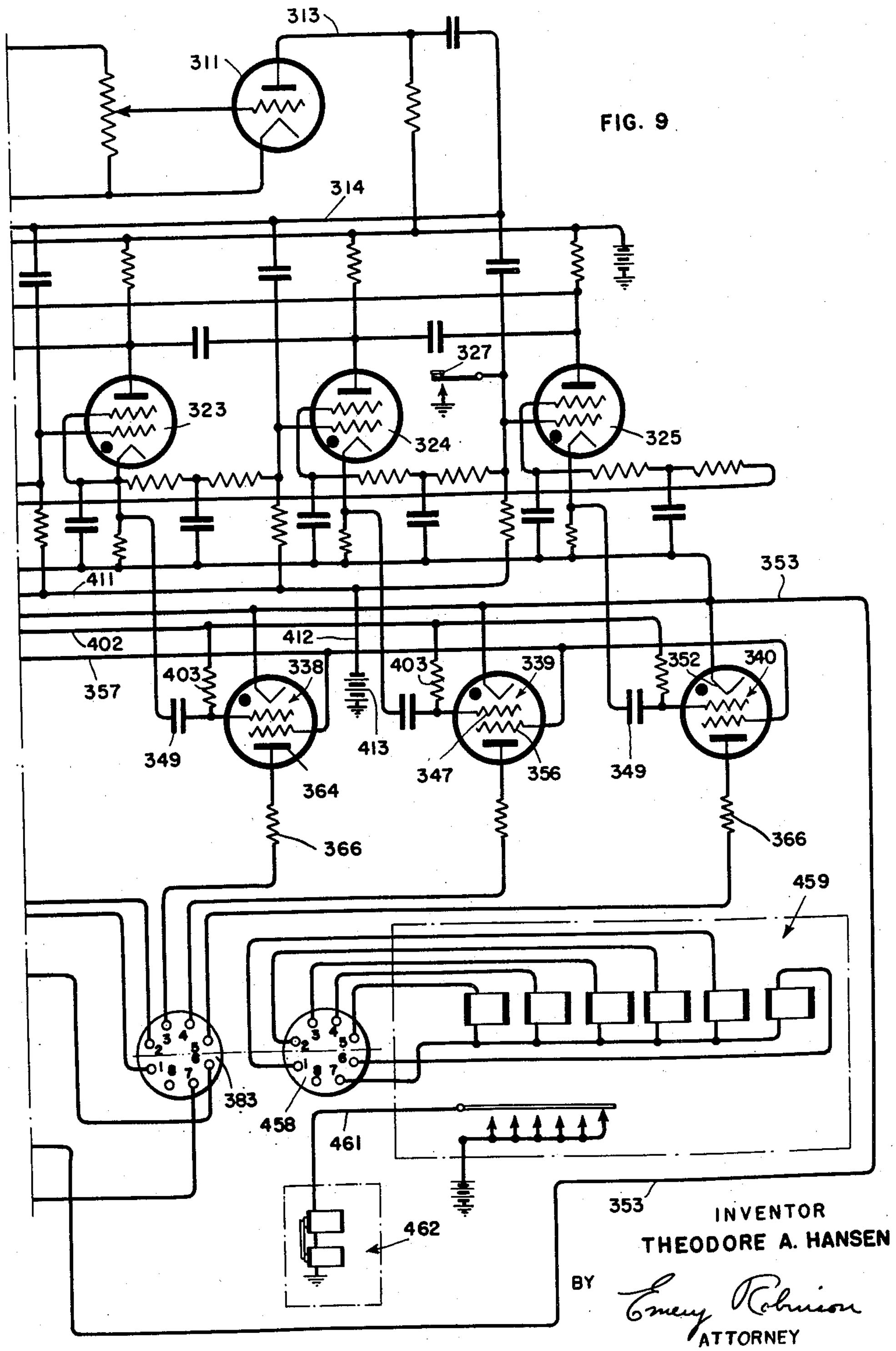
Figure 11:
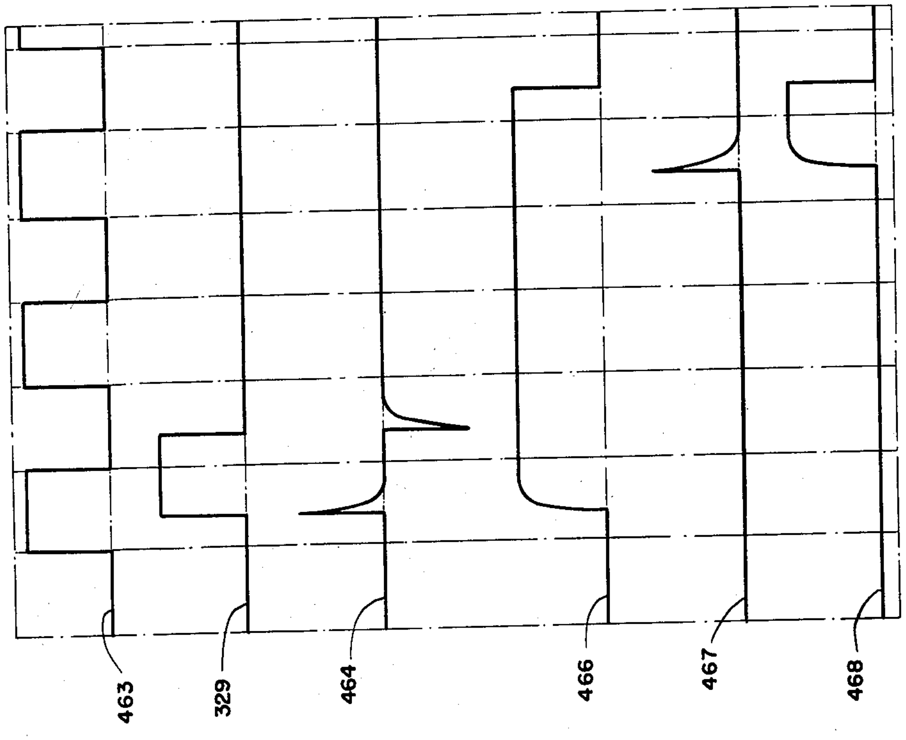
Figure 10:
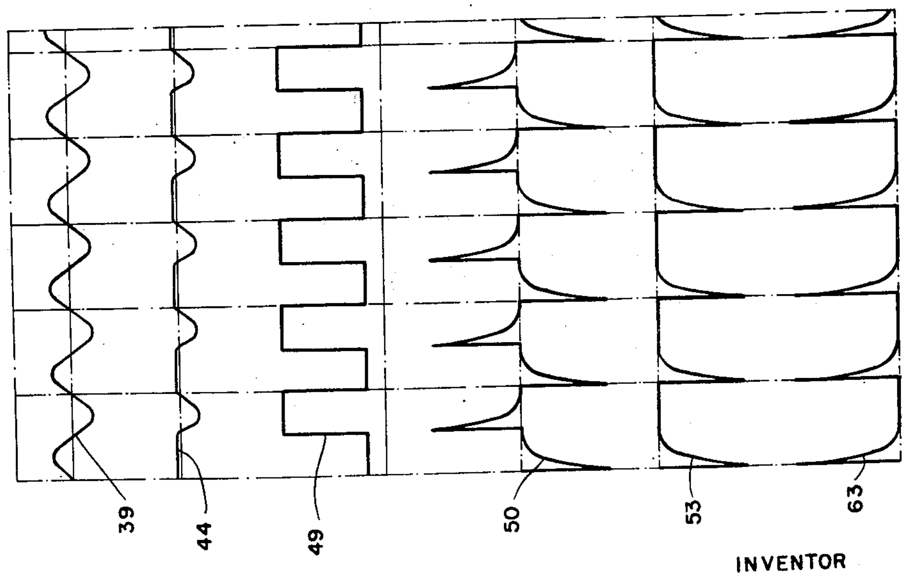

Figs. 3, 4, and 5 show in detail the apparatus and circuits comprising the transmitting station;

Fig. 6 shows a relative arrangement of the views disclosing the receiving station;

Figs. 7, 8, and 9 show in detail the apparatus and circuits comprising the receiving station;

Fig. 10 shows the voltage wave characteristics, in successive stages, as generated by the pulse generator, and Fig. 11 shows the voltage wave characteristics and relative timing of certain operational sequences of the receiving apparatus.

Figure 1:
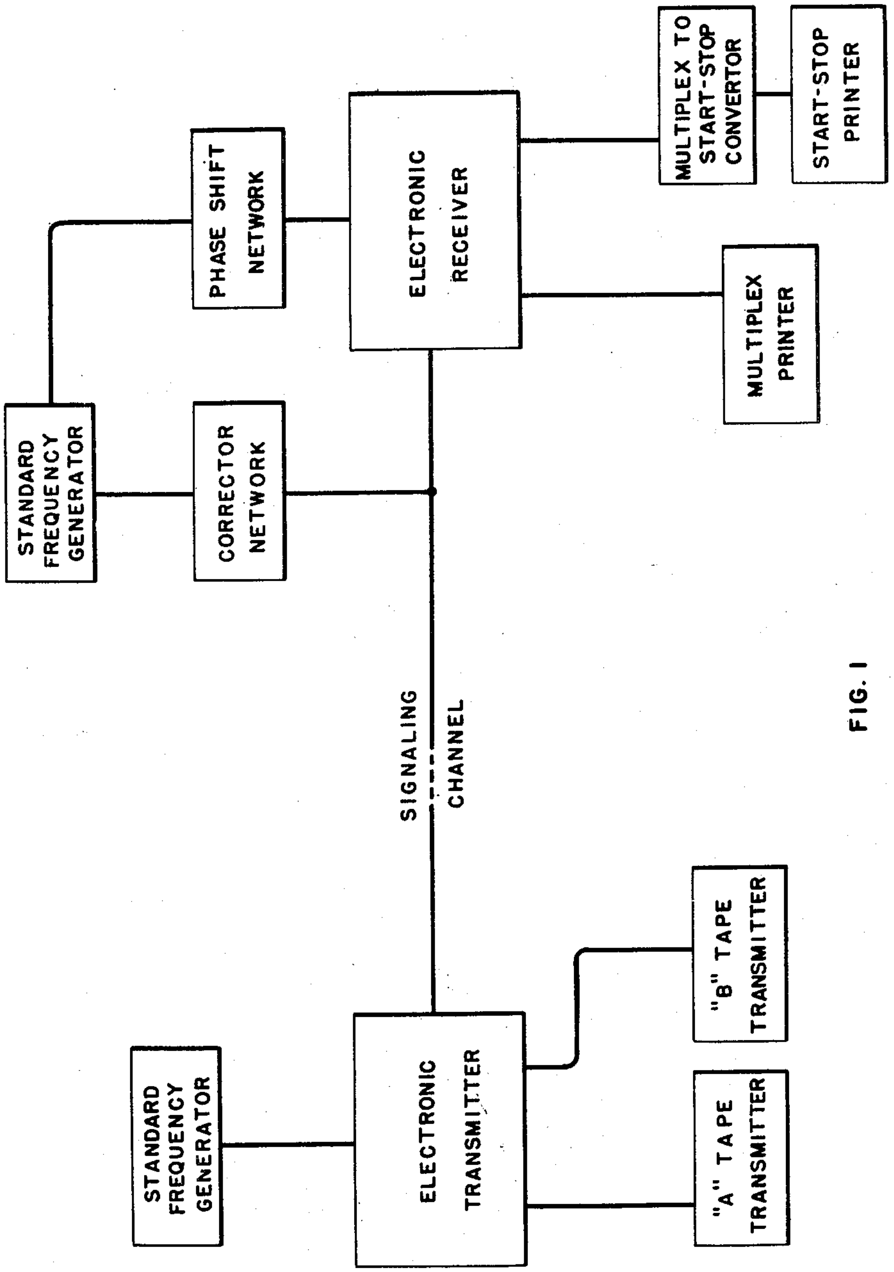
Fig. 1 shows in block form a diagrammatic view of the various constituent parts of the proposed multiplex system.

By referring to Fig. 1 it is possible to obtain a general idea of the component parts of the apparatus and their inter-relation with respect to each other forming the multiplex system. With respect to the transmitting station only, as shown to the left in Fig. 1, a standard frequency generator is provided and is connected to the electronic transmitter; likewise two tape transmitters are connected to the electronic transmitter. The electronic transmitter itself may, in general, be described as being comprised of three parts, said parts being a pulse generator, an electronic distributor, and transmitting apparatus including a plurality of relay tubes operating in conjunction with the tape transmitters and the electronic distributor. The general description of the receiving station, as shown in Fig. 1, will be postponed until a full description has been made with respect to the transmitter station and just prior to the description of the receiving station.

In describing the system and apparatus hereinafter, the various units will be described separately and then in operational combination. Such description appears to make the apparatus and system more comprehendable and understandable.

*Standard frequency generator*

By referring to Fig. 4 it may be seen that a standard frequency generator has been provided, which is indicated generally by the numeral 21. This generator may be any of those well known in the art and obtainable commercially, but preferably is of the crystal controlled type in order that the frequency of the voltage generated may be kept within very close limits of deviation. The generated standard frequency has the customary A. C. voltage characteristic of a sine wave.

*Pulse generator*

The voltage generated by the standard frequency generator is passed to a pulse generator which, in general, comprises an amplifier indicated generally by the numeral 22, a rectifier indicated generally by the numeral 23, and an amplifier indicated generally by the numeral 24.

With respect to Figs. 3, 4, and 5, it may be seen that a grounded battery 26 supplies D. C. potential over a common conductor 27 to junction point 28 and thence over a conductor 29 and through load resistors 31 to the plates or anodes 32 of the amplifier tube 22. The cathodes 33 of the tube 22 are connected to a common conductor 34 which is grounded at 35.

The standard frequency which is generated by the unit 21 and which is in the form of a sine wave is fed over conductor 37 to the control grid 38 of the left-hand section of the vacuum amplifier triode tube 22 which may be of the 6SN7 type. The resulting amplification process, through the operation of this tube, results in an amplified voltage such as disclosed as the curve 39 in Fig. 10.

The amplified output of the left-hand section of tube 22 is fed by means of a conductor 41 to the left-hand section of the twin diode rectifier tube 23 which may be of the 6H6 type. A coupling condenser 42 is provided between the output circuit of the left-hand section of the amplifier tube 22 and the cathode 43 of the left-hand section of the twin diode tube 23, to which the above-mentioned output is directed, in order to prevent direct current being fed to the cathode 43 from the D. C. source over conductor 29, through resistance elements 31 and over conductor 41. The voltage impressed on the cathode 43 of the tube 23 is rectified by the left-hand section in order to remove the positive half of the wave, as shown as voltage curve 44 of Fig. 10.

The negative half of the wave output of the left-hand section of rectifier tube 23, as shown as 44 in Fig. 10, is impressed on a conductor 46 and passes to the control grid 47 of the right-hand section of vacuum triode tube 22. Direct current is applied to the plate 32 of this section of the tube as it was to the left-hand section; namely, over conductor 29, through resistance element 31, and through a conductor 48. The grid 47 is normally at zero bias and since only a comparatively small part of the applied negative grid voltage (output of left-hand section of rectifier tube 23) is required to bias the grid 47 to the plate current cut-off value, there results an output which is in the form of a square wave, as shown by voltage curve 49 in Fig. 10.

The square wave output of the right-hand section of the vacuum amplifier tube 22, as shown as 49 in Fig. 10, is not impressed as such on the input of the right-hand section of the rectifier tube 23 because of a differentiating network. This network, which is comprised of the condenser 52 and the resistance element between the common conductor 34 and the cathode 43, will not pass any direct current. Thus, instead of square wave voltage having the flat horizontal sections, as shown as 49 in Fig. 10, which has the attributes of direct current at the constant points, a wave having pulse characteristics as shown as 50 in Fig. 10, will be impressed on the cathode 43 of the right-hand section of the tube 23. Likewise, the condenser 52 precludes potential from the D. C. source from reaching the cathode 43. The tube 23 rectifies the input voltage, removing the positive half of the wave and passing the negative half only, as shown as 53 in Fig. 10, over a conductor 54 to a potentiometer indicated generally by the numeral 56.

The negative half of the wave then passes over a conductor 57 to the control grid 58 of a triode tube 24 which may be of the 6J5 type. The plate of the tube 24 is supplied with direct current from the battery source 26 over the common conductor 27 to the junction point 28, over a common conductor 59 to a junction point 61, and through a resistance element 62 to the plate. The cathode of the triode tube 24 is supplied with ground from 35. Upon the operation of the tube 24, due to the negative input voltage, an output voltage is generated which, instead of being negative, is the positive half of a voltage wave, as shown as 63 in Fig. 10. The positive output voltage passes from the plate over a conductor 64, through a coupling condenser 66, and over a common conductor 67 to the control grids of a plurality of electron tubes in the distributor, as will be described hereinafter. The coupling condenser 66 is provided so that the direct current supplied to the plate of the tube 24, through the resistance element 62, may not pass over the common conductor 67 to the control grids of the electron tubes in the distributor but instead will be precluded from so doing by means of the condenser 66.

It is to be noted that the cathodes 33 of tube 22, cathodes 43 of tube 23, and the cathode of tube 24 are all grounded over common conductor 34 to the common grounding point 35. It is to be further noted that the output of the standard frequency generator 21, after it passes over the conductor 37, is coupled to the grid 38 by means of a resistance element 69.

*Electronic distributor*

The electronic distributor at the transmitting station is disclosed in Figs. 3, 4, and 5, arranged in the order shown in Fig. 2. In general, it is comprised of ten gas filled tubes 75 to 84, inclusive, which as previously mentioned, may be of the 2050 "thyratron" type tubes. It is to be noted that ten tubes are provided in the instant arrangement because of the fact that the present system disclosed is a two channel multiplex system. However, in the event that a four channel system were to be used, the number of distributor tubes would be increased accordingly to twenty. In the instant application there is one tube provided for each character impulse for the two channels, making ten in number. Each of the tubes, 75 to 84, inclusive, is provided with a plate or anode 86, a cathode 87, a control grid 88 and a screen grid 89. In describing these tube elements hereinafter, the numbers indicated immediately above will be given followed by the number designating the particular tube to which reference is made.

The plate or anode 86 of each of the tubes 75 to 84, inclusive, is connected over a conductor 91 and through a load resistor 92 to the common conductors 27 and 59, previously referred to as leading from the D. C. source 26. By reason of the anode connection with the positive battery 26 over conductors 27 and 59, the anodes 86 of the tubes will normally have a high positive potential impressed thereon. The cathode 87 of each of the tubes is connected by means of a conductor 93 and through an individual resistor 94 to a common conductor 96 which is grounded at 97. The control grid 88 of each of the tubes is connected by means of a short conductor 98 to a conductor 99, connected through a condenser 101 to the common conductor 67, previously referred to. The conductor 99 has a resistance 102 therein which is on the opposite side of a junction point 103 from the anode lead 98. The end of the conductor 99 closest to the resistor 102 is connected to a common conductor 104, which is similarly connected with respect to all of the tubes. The screen grid 89 of each of the tubes is connected by means of conductor 106 directly to the cathode 87, both of which are by-passed to ground 97 through a condenser 107.

It may also be seen that the cathode 87 of the various tubes is connected by means of the associated conductor 93 over a conductor 108 having a resistor 109 therein and through a second resistor 111 to a common conductor 112 extending to all of the tubes and similarly connected. A short conductor 113 extends from the conductor 108 and leads to the control grid of a twin triode relay tube 153, for a reason which will be described hereinafter.

Bias voltage from the battery 121 is fed over a conductor 119 to the voltage divider comprised of resistors 116 and 118 connected by a conductor 117 and thence from junction point 123 and over a conductor 122 to the conductor 104, previously mentioned.

Thus, it may be seen that the control grids 88 of the individual tubes are normally biased with a negative voltage which is the difference between the IR drop in the resistor 102 and the negative voltage of the conductor 104. The biasing circuit may be traced from the negative grounded battery 121, over the conductor 119, through the resistor 118 to the junction point 123, over the conductor 122, over the conductor 104, over the conductor 99 and through the resistor 102 to the junction point 103, over a conductor 149, through the resistors 128 and 126 associated with the tenth tube 84, over the conductor 93 and through the cathode load resistor 94 (tube 84), and through the common conductor 96 to ground at 97.

The screen grids 89 and their conductors 106 are connected to the cathode 87 by means of a conductor 124 extending therebetween. The conductor 124 and the cathode 87 are connected through a resistor 126 to junction point 127 and through a second resistor 128 to the conductor 99 associated with the succeeding tube 76. The junction point 127 is connected by means of a conductor 129 and through a condenser 131 to the common grounded conductor 96, previously mentioned.

The anodes 86 of successive tubes such as 75 and 76 are interconnected by means of a conductor 132 having a condenser 133 therein.

All of the distributor tubes 75 to 84, inclusive, are connected similarly as has just been described with respect to tube 75 itself or tubes 75 and 76.

A conductor 134 is provided which connects the conductor 91 of the plate 86 of tube 75 through a condenser 135, similar to condensers 133, to the conductor 91 of the plate 86 associated with the tenth tube 84, for a purpose to be later described.

The conductor 91 associated with the anode 86 of the tube 75 is connected by means of a resistor 137 to a conductor 138 which extends to the control grid of a triode tube which will be described more fully hereinafter. The conductor 138 and resistor 137 are also connected through a resistor 139 to the conductor 134, previously described.

The conductor 91 extending from the plate 86 of the fifth tube 79 is also connected by means of a resistor 141 to a conductor 142 which extends to the control grid of a second triode tube also to be utilized in a manner and for a purpose as will be described hereinafter. The resistor 141 and conductor 142 are connected through a resistor 143 to the conductor 91 associated with the plate 86 of the sixth tube 80.

A condenser 144 is provided which is connected between the common grounded conductor 96 and the common conductor 104.

A start key 146 is connected to the conductor 99 associated with the control grid 88 of the tenth tube 84 and serves, when the key is depressed, to connect the conductor 99 to ground at 147.

It is to be noted that the conductor 142 is connected by means of a conductor 148 to the common conductor 112, previously described.

Hereinafter in the description of the operation of the electronic distributor, just described as to parts and connections, such description will be made with respect to two associated tubes with no further explanation being given unless there are other elements which act differently or independently of the tubes described. The description will be made in this manner inasmuch as the various distributor tubes 75 to 84, inclusive, operate similarly with respect to themselves and to each other except as will be noted.

*Operation of electronic distributor*

During the time that the electronic distributor, as exemplified by the tubes 75 to 84, inclusive, is not operating the plates 86 thereof have impressed thereon a positive voltage and the control grids 88 thereof are biased negatively as previously described.

In the event that the pulse generator, previously described, is operating during the non-operating period of the electronic distributor, the positive pulses which are transmitted to the control grids of the tubes, over the common conductor 67, will not result in any operation or firing of these tubes inasmuch as such positive pulse is not sufficient to raise the grid potential a sufficient amount to the firing value of the tube.

Assuming now that it is desired to start the electronic distributor into operation and that the standard frequency generator and the pulse generator are operating to transmit positive pulses, as indicated at 63 in Fig. 10, to the common conductor 67, previously described, the start button 146 is depressed causing it to come into engagement with ground at 147. As a result of the closure of the start button or key 146, an electrical circuit will be established which may be traced from ground 147 through the start key 146, over the conductor 99 and through the resistor 102 associated with the tenth tube 84, through the common conductor 104, through the conductor 122 to junction point 123 with the conductor 117, through the resistor 118, and over the conductor 119 to ground negative battery 121. It is to be remembered that in the previous description the grid 88 of the tube 84 was described as being biased negatively over a circuit which included the members just described. As a result of the closure of the above-described circuit, the biasing negative voltage will no longer be present on the control grid 88 but instead will go to ground 147 and the biasing potential of the control grid 88 will be reduced to zero. Inasmuch as the Thyratron tubes disclosed in the present embodiment have a firing characteristic which usually is a slight negative value, the reduction of the grid voltage to zero will result in the gas in the tube ionizing and in the operation or firing of the tube 84.

The operation or firing of the tube 84 may be traced in an electrical circuit from positive battery 26, over the common conductor 27, over the common conductor 59, through the load resistor 92 and the conductor 91 associated with the anode 86 of the tube 84, to the cathode 87 of this tube (which is now conducting), over the conductor 93, through the cathode load resistor 94, and over the common conductor 96 to ground at 97. Such a circuit will be established and the tube will continue to fire until such time as external means are utilized to cause the tube to be extinguished.

As previously described, a condenser 135 is connected to a conductor 134 which joins the anode conductors 91 of tubes 75 and 84. During a non-operating condition of both of these tubes the condenser 135 will be in an uncharged condition due to the fact that the conductors 91 of both tubes 75 and 84 will be impressed with a positive charge from the positive battery 26, as previously described. However, at such time as the tube 84 operates or fires, as just described, there will be a drop in the potential across the anode load resistor 92 associated with the tube 84 which will result in the condenser 135 becoming charged.

As was previously described, the control grids 88 of the various tubes are biased negatively by means of a circuit which includes the cathode and cathode load resistor of the preceding tube. The firing of the tube 84 and the resultant electrical circuit, which was described as passing through the tube, will have the effect of adding positive voltage to the negative battery circuit, which may be traced through the cathode 87 of the tube 84, over the conductor 93, through the cathode load resistor 94, over the common conductor 96 to ground at 97. As a result of the adding of positive voltage to the negative battery 121, the control grid 88 of tube 75 will be less negatively biased. The reason for the decrease in the biasing voltage of the grid 88 is due to the increase of current in the bridge circuit which causes an increase in the IR drop across the resistor 102 associated with the tube 75. However, the tube 75 will not operate or fire at this time inasmuch as was previously described, the firing value of the Thyratron tubes is a slight negative value, which has not been reached. Thus, at this time tube 75 will be conditioned for operation but will not operate.

After the control grid 88 of the tube 75 has been conditioned less negatively, the next incoming positive pulse, such as shown at 63 in Fig. 10, of the pulse generator, previously described, passes over the common conductor 67 and over the conductors 99 and 98 to all of the grids 88 of the various tubes. As a result of such positive pulse being impressed on the control grids 88 of all the tubes, the biasing voltage of the grid which has been conditioned will be reduced from the conditioning value to a sufficiently low voltage to fire that particular tube. As a result of such reduction in bias potential to the control grid 88 of the tube 75 this tube will operate or fire.

It is to be noted that only a tube whose grid has been conditioned, as previously described, will be caused to fire by the positive pulse from the pulse generator which, in the instant description, is tube 75. Inasmuch as the positive pulse originating from the pulse generator and the standard frequency generator is almost instantaneous, the control grid 88 will be reduced sufficiently in voltage for an instant only and thereafter will resume its prior unconditioned biasing voltage.

As was previously mentioned, each of the conductors 99 leading from the common conductor 67 to the grid 88 is provided with a blocking condenser 101. This condenser allows the positive pulse from the pulse generator to pass over the conductor 99 to the grid 88 but prevents the D. C. biasing voltage from being fed back to the common conductor 67.

Upon the firing of the tube 75, the potential on the anode 86 of this tube which has been reduced due to the IR drop across the load resistor 92 results in a discharge of the condenser 135 which has previously been described as being charged. The path of discharge of the condenser 135 may be traced from the condenser, over the conductor 91, plate 86, and cathode 87 associated with tube 75, over the conductor 124, over the conductor 106 and through the condenser 107 to the common conductor 96, over the common conductor 96 to the condenser 107 associated with the tube 84, over the conductor 124 associated with this tube, through the cathode 87 to the plate 86, over the conductor 91, and over the common conductor 134 back to the opposite side of the discharging condenser 135. As a result of such circuit the cathode anode potential of tube 84 is in an opposite direction from that normally in the tube, resulting in the tube 84 being extinguished because the tube potential is reduced to zero. Thus, it has been seen that upon the firing of one tube a circuit is established which conditions the succeeding tube for firing and which when such firing occurs results in the extinguishing of the preceding tube through the anode circuit of the firing tube.

A delay integrating network comprising the resistors 126 and 128 and the associated condenser 131 associated with each of the tubes has been provided between the cathode 87 and the control grid 88 of the succeeding tube so that the front edge of the conditioning wave (reducing control grid bias from a large negative value to a less negative value) will not coincide with the firing pulse received on that grid from the pulse generator. Such a delay network is utilized in order to preclude a tube from firing at a time when it is being conditioned.

The filter condenser 144, previously described as being connected between the common conductors 96 and 104, has been included in the circuit in order to have a stabilizing effect thereon.

It might be noted that each pair of associated tubes 75 to 84, inclusive, are provided with a condenser 133 between the plates 86 thereof. These condensers are similar to and operate in a similar manner to the condenser 135 which was described as being between the anode circuits of the tubes 84 and 75. Thus, it may be seen that the electronic distributor will operate through the continuous successive firing of one tube after the other and the successive extinguishment of the preceding tube upon the firing of a successive tube in a manner as was just described. Once the electronic distributor has been started into operation by means of the closure of the start key 146 and as long as the positive pulses are incoming from the standard frequency generator and the pulse generator, the electronic distributor will continue to operate with the tubes 75 to 84, inclusive, firing successively one after the other. It is to be noted that the start switch 146 will be provided with means so that after the depression thereof and the firing of the tube 84, it will automatically open and no longer be in connection with ground at 147.

*Transmitting apparatus*

The transmitting apparatus included in the present multiplex system contemplates the use of an "A" tape transmitter indicated generally by the numeral 151 and a "B" tape transmitter indicated generally by the numeral 152. Five twin triode tubes 153 to 157, inclusive, are provided as is a transmitting relay tube 159. A pair of control tubes 161 and 162 are associated with the "A" tape transmitter 151 and a pair of similar control tubes 163 and 164 are associated with the "B" tape transmitter 152.

Each of the twin triode tubes 153 to 157, inclusive, is provided with a cathode 166, a control grid 167, and an anode or plate 168 forming one element of the twin tube; the other element is formed of a cathode 170, a control grid 171 and a plate or anode 172. As has been previously mentioned, the control grids 167 and 171 are connected by means of conductors 113 to the output circuit of the distributor tubes 75 to 84, inclusive, through the resistors 109 and over the conductors 108. The cathodes 166 and 170 of the triode tubes are connected by means of a conductor 173 to the common conductor 96 which is grounded at 97. The anodes 168 and 172 of tubes 153 and 154 and the anode 168 of the tube 155 are connected by means of conductors 175 to 179, inclusive, to five contact points indicated by the numerals 1 to 5, inclusive respectively, of a socket 181 which is associated with the "A" tape transmitter 151 in a manner which will be described hereinafter. Likewise, the anode 172 of the tube 155 and the anodes 168 and 172 of the tubes 156 and 157 are connected by means of conductors 182 to 186, inclusive, to five contact points of a socket 188 associated with the "B" tape transmitter 152 in a manner and for a purpose to be later described.

Referring now to the socket 181, it is to be noted that a sixth contact point is connected by means of a conductor 189 to the anode 190 of the control tube 162, previously mentioned. A seventh contact point of the socket 181 is connected by means of a conductor 191 to a positive grounded battery 192. An eighth contact point is connected over a conductor 193 to junction point 194 of a conductor 196 which is connected to the positive grounded battery 26 but separated from the junction point 194 by a resistor 197. Inasmuch as the socket 188 is connected similarly as that described for socket 181, it does not appear necessary to indicate specifically such connections. It might be noted, however, that the conductor 196 leading from the battery 26 but separated therefrom by a resistor 197 is connected to the eighth contact point associated with the socket 188.

Referring now to the control tubes 161 and 162 associated with the "A" tape transmitter 151 and the similar control tubes 163 and 164 associated with the "B" tape transmitter 152, it is to be seen that the tubes 161 and 163 are each provided with an anode 201 which is connected through a resistor 202 and over a conductor 203 to the common conductors 27 and 59, previously described. The tube 161 is further provided with a control grid 204 which is connected by means of a conductor 206 to the conductor 142, previously described, and which has a resistor 207 placed therein; the tube 163 has a control grid 208 which is connected over conductor 209 to the conductor 138, previously described. The tube 161 is also provided with a cathode 211 which is grounded at 212. A conductor 213 is inserted connecting the cathode 211 to the grid conductor 206 and is provided with a condenser 214 therein. The tube 163 is similarly provided with a cathode 216 which is connected over conductor 217 to grounded common conductor 34. Likewise, a condenser 218 is inserted between the cathode 216 and the conductor 209 leading from the grid 208. Referring back to the tube 161, a conductor 219 having a resistor 221 therein is connected to the anode lead and extends to junction point 222 from whence it branches off into a conductor 223 having a resistor 224 therein which is connected to the conductor 142, previously mentioned, and a conductor 226 which is connected to a grid 227 of the control tube 162. The control tube 162 also has a cathode 228 which is grounded at 229. Inasmuch as the connections of the control tube 164 associated with the "B" tape transmitter 152 are similar to those as described for the control tube 162, further description of them is not deemed necessary.

The triode transmitter tube 159, previously mentioned, has a control grid 231 which is connected by means of a conductor 232 to junction point 233 which has branching therefrom a conductor 234 having a resistor 236 therein which is connected to the conductor 196 at junction point 237 and a conductor 238 having a resistor 239 therein which is connected to the conductor 119 immediately adjacent the negative grounded battery 121. The anode 241 of the tube 159 is connected over a conductor 242 to a positive battery 243 and thence over conductor 244 to the resistor 246 forming part of a potentiometer, indicated generally by the numeral 247. The resistor 246 is connected through a resistor 248, over a conductor 249, and through a switch 250 to a conductor 251 leading from the cathode 252 of the tube 159. The conductors 249 and 251 are grounded at 253. A negative battery 255 is also provided for polar operation which is placed in the circuit in the event that the switch 250 is moved to its upward position (Fig. 4) rather than its lower position, as shown for neutral operation.

The movable member of the potentiometer 247 is connected by means of conductor 254 to one contact member 256 of a signal output jack, the opposite contact member 257 of which is grounded at 258.

Inasmuch as the "A" and "B" tape transmitters 151 and 152 are similar, similar identifying numerals will be used for both tape transmitters, and in the event that in a description of the operation of the transmitting apparatus it becomes necessary to refer to elements of the two tape transmitters, the elements will be described by their common numerals and reference will be made to the specific transmitter referred to.

The tape transmitters 151 and 152 are each provided with a plug 261 having eight contact points thereon which is adapted to cooperate with the socket 181 of the "A" tape transmitter and the socket 188 of the "B" tape transmitter. The sensing controlled contacts of the tape transmitters have been shown schematically but consist of five movable contacts 263 to 267, inclusive, which are connected over conductors bearing the same identifying numerals to the contact points 1 to 5, inclusive, respectively of the plug 261. A bus bar 269 is provided which cooperates with all of the movable contacts and which is connected over conductor 270 to the No. 8 contact point of the plug 261. A tape stepping solenoid 272 is provided, one side of whose winding is connected over conductor 273 to the No. 7 contact point of the plug 261 and the opposite side of whose winding is connected over conductor 274 to the stationary contact member of a switch indicated generally by the numeral 276. The movable contact member of the switch 276 is connected over conductor 277 to the No. 6 contact point of the plug 261. While the tape transmitters 151 and 152 may be of any commercial type, many of which are known in the art, the instant embodiment contemplates the use of a tape sensing mechanism such as that disclosed in U. S. Patent 2,418,928, issued April 15, 1947, to W. R. Gemmel (excepting mechanical distributor and dual sensing device control), or in Bulletin No. 141, Issue 3, issued by the Teletype Corporation, Chicago, Illinois, in March 1942. The switch 276 has been provided in order to be able to control manually the operation of the tape transmitter 151.

*Operation of transmitting apparatus*

In the following description of the transmitting apparatus, it will be assumed that the contact point 263 is in a spacing position whereas the contact point 264 is in a marking position, as is well known in the art with respect to such terminology. The spacing condition indicates that the associated contact is not closed by a sensing pin passing through a perforation in the tape and, therefore, is not in engagement with the associated bus bar 269 having battery applied thereto, whereas a marking condition signifies that the associated contact is closed by a sensing pin passing through a perforation in the tape being sensed and causing engagement with the associated bus bar 269. In the instant disclosure of Fig. 3 and under the assumed conditions just described, the contact point 263 would be out of engagement with the bus bar 269, whereas the contact point 264 in marking position would be in engagement with the bus bar 269. It is to be understood, however, that the remaining contact points 265 to 267, inclusive, will be in either a marking or spacing condition, depending on the signal perforated in the tape, in accordance with the well-known five unit Baudot telegraph code.

As previously described, the output circuit of the distributor tubes 75 to 84, inclusive, are each connected by means of the conductor 93, the conductor 108 having the resistor 109 therein, and the conductor 113 to the control grids 167 or 171 of the twin triode tubes 153 to 157, inclusive. Assuming in the instant example that the tube 75 is in its unoperated or nonconducting condition, the grid 167 of the left-hand section of the tube 153 will be biased to a negative value. Such negative bias occurs due to the IR drop across the resistor 111 and the negative battery 121 of a circuit which may be traced from ground at 97, over the conductor 95, through the resistor 94, over the conductor 108, through the resistor 109, through the resistor 111, over the conductor 112, and over the conductor 119 to grounded negative battery 121. Under this condition with grid 167 of the tube 153 being biased negatively beyond its cutoff value, the tube 153 will be nonconducting.

Assuming, however, that the tube 75 is now operating as has been described with respect to the operation of the electronic distributor, the output voltage of the tube 75 may be traced, as previously described, from the cathode 87, through the conductor 93 and the resistor 94. Due to the addition of such voltage there will result a further potential drop across the resistor 94 which will cause an increased IR drop across the resistor 111 and the negative battery 121 which causes the grid 167 of the tube 153 no longer to be biased negatively but instead to be increased to zero voltage. As a result of such change to the grid 167, the tube 153, or at least the left-hand section thereof comprising the anode 168 and the cathode 166, will become conditioned for conducting depending on a condition now to be described.

As previously mentioned, in the instant example, the contact point 263 is in its spacing position out of engagement with the bus bar 269. As may be seen by referring to the drawings, under such condition the positive grounded battery 26, which is connected through resistor 197 to junction point 194 and over conductor 193 to the eighth contact point of the socket 181, and which in turn is connected through the eighth contact point of the plug 261 and over the conductor 270 to the bus bar 269, will not be impressed through the contact point 263 on the conductor associated therewith bearing the same number because said contact point is open. As a result of such condition no electrical circuit may be traced through the conductor 263 to the No. 1 contact point of the plug 261, through the No. 1 contact point of the socket 181, and over the conductor 175 to the anode 168 of the left-hand section of the tube 153. Thus, while the tube 153 has been conditioned for conduction because the grid 167 has a zero potential applied thereto, the tube will not conduct.

Under the above described condition with the left-hand section of the twin triode tube 153 not conducting, which occurs when the tape sensing mechanism associated with that particular tube element is in spacing position, a condition exists whereby the voltage of the grid 231 of the transmitting tube 159 is zero. Such condition may be seen by reference to the bridge circuit associated therewith which may be traced from grounded positive battery 26, through the resistor 197, over the conductor 196 to junction point 237, over the conductor 234, through the resistors 236 and 239, over the conductor 238 to grounded negative battery 121. Because of the values of the negative battery 121, the positive battery 26 and the constants of the resistors 197, 236 and 239 under the above-mentioned condition, the control grid 231 of the transmitter tube 159 will have a zero grid voltage. Inasmuch as the transmitting tube 159 controls the transmission of outgoing signals to the signaling channel, not shown except schematically in Fig. 1, the following condition will exist as a result of the zero condition of the grid 231. Because of this zero condition of the grid, the tube 159 will be conducting and a circuit may be traced from ground 253 through the switch 250 which is in its lower position for neutral operation, over the conductor 249, through the resistor 248, through the resistor 246 forming part of the potentiometer 247, over the conductor 244, through the positive battery 243, over the conductor 242 to the anode 241, through the tube 159 which is now conducting, to the cathode 252 and over the conductor 251 to ground at 253. Likewise, because of the potentiometer 247, a circuit may also be traced from ground 258, through the one contact element 257 of the signal output jack, through the second contact element 256 thereof, over the conductor 254 to the variable member of the potentiometer 247, through the resistor 246 with which it is in engagement, over the conductor 244, through the positive battery 243, over the conductor 242 to the anode 241 of the transmitting tube 159, through the tube 159 which is now conducting to the cathode 252 thereof, and over the conductor 251 to ground at 253. Because of the particular direction of the current over the circuit just described, a negative line signal will be transmitted from the output jack exemplified by the contact members 256 and 257 to the signaling channel. Such neutral negative line signal occurs, as described above, when there is a spacing condition existing.

Following the assumptions previously made for the instant description, consideration must now be given to the condition whereat the contact point 264 is in engagement with the bus bar 269 signifying a marking condition. In order to complete the desired description it will be assumed that the distributor tube 76 is firing, thus conditioning the right-hand section of the twin triode tube 153, as exemplified by the anode 172 and the cathode 170, for conduction. Under this condition it is to be remembered the control grid 171 of tube 153 will have a zero voltage impressed thereon, as previously described. When such condition occurs, an electrical circuit may be traced from ground at 97, over the common conductor 96, over the conductor 173 to the cathode 170 of the tube 153, through the tube 153 to the anode 172, over the conductor 176 to the No. 2 contact point of the socket 181, to the No. 2 contact point of the plug 261 which will be in engagement therewith, over the conductor 264 to the contact point 264 now in engagement with the bus bar 269, through the bus bar 269 and over the conductor 270 to the No. 8 contact point of the plug 261 to the No. 8 contact point of the socket 181, over the conductor 193 to the junction point 194 with the conductor 196, and through the resistor 197 to positive grounded battery 26. As a result of the circuit just described and because of the potential drop due to the conduction of the tube, the bridge circuit previously described as supplying the grid of the transmitter tube 159 with zero voltage, will be altered to such an extent that the grid 231 will receive a negative biasing voltage which will result in the blocking of conduction of the tube 159. Such change in voltage is primarily due to the voltage drop across the resistor 197 upon the conduction of the tube 153. At such time as the transmitting tube 159 becomes nonconducting no electrical circuit may be traced from the positive battery 243, through the tube and over the potentiometer 247 to the signal output plug as exemplified by the contact members 256 and 257, and, therefore, a zero line current condition will occur on the signaling channel. Thus, it may be seen that when the tape sensing mechanism is in a marking condition, as just described, a zero condition will occur on the signaling channel. Inasmuch as the operation of the triode tubes are under the direct control of the output of the distributor tubes they will cease to conduct after the associated distributor tube is extinguished.

In the event that polar operation is preferred to the neutral operation just described, the switch 250 should be positioned in engagement with its upper contact point, rather than in engagement with its lower contact point as disclosed in Fig. 4 of the drawings. Assuming the same conditions that have been described above, in the event that a spacing condition exists, the tube 159 will be conducting and an electrical circuit may be traced similar to that traced above with the exception that it must be traced through the negative grounded battery 255. However, because of the values of the battery 243, the negative grounded battery 255 and the constants of the resistors 246 and 248, a negative signal will still be transmitted over the signaling channel through the jack exemplified by the contact elements 256 and 257. In the event, however, that a marking condition exists, the tube 159 will no longer be conducting, as was described with respect to the neutral operation above. It is to be remembered that under the neutral operation with a marking condition that the tube 159 was not conducting and a zero condition existed on the signaling channel because no circuit could be traced from the battery 243 through the tube 159. Under the polar operation it is still true that no circuit can be traced through the tube 159 for the battery 243 but, however, under this condition a circuit may be traced from ground at 253, through the negative grounded battery 255, through the switch 250 which is now in engagement with its upper contact point, through the conductor 249, through the resistors 248 and 246, through the movable member of the potentiometer 247 in engagement with the resistor 246, and over the conductor 254 to the one contact element 256 of the output jack, through the second element 257 which is bridged with the element 256 by means of a plug for the signaling line to ground at 258. As the negative battery 255 is grounded at 253 a positive impulse will be transmitted over the signaling channel. Thus, it may be seen that under the polar operation when a spacing condition exists in the tape sensing device and the tube 159 is conducting, a negative impulse will be transmitted over the signaling channel identical as in neutral operation. However, when a marking condition exists a positive impulse will be transmitted over the signaling channel instead of the zero condition which exists during neutral operation. It should be noted, however, that the present receiving apparatus to be described hereinafter will not operate on polar signals without intermediate means to alter the positive impulses to a zero value prior to their conduction to the selector tubes. Such alteration may be by means of an electronic relay, etc.

It is to be noted that the above description has referred mainly only to the "A" tape transmitter and the relay tubes associated therewith. However, it is to be understood that the "B" tape transmitter 152 and its associated relay tube and apparatus operates similarly to that described with respect to the "A" tape transmitter 151 and for a similar purpose. Inasmuch as the distributor tubes 75 to 84, inclusive, fire successively they therefore condition successively the individual tube elements of the twin triode tubes 153 to 157, inclusive. Therefore, the first five tube elements cooperate with the "A" tape transmitter and the transmitting tube to transmit coded impulses over the signaling channel, whereas the second five distributor tubes cooperate with the "B" tape transmitter 152 and the remaining five tube elements of the relay tubes, to cause signaling impulses to be transmitted from the transmitter tube 159 over the signaling channel which are representative of the intelligence in the "B" channel. Thus, in this way two channel multiplex operation is provided.

Previous mention was made of the control tubes 161 and 162 associated with the "A" tape transmitter 151 and the control tubes 163 and 164 associated with the "B" tape transmitter 152. These tubes, which operate under the control of distributor tubes, are utilized to step the tape in the tape transmitter in a manner which will now be described. Inasmuch as the control tubes 161 and 162 operate in conjunction with the "A" tape transmitter and the control tubes 163 and 164 operate in a similar manner with respect to the "B" tape transmitter, description will be made of the operation of the former tubes only.

Inasmuch as it is not desired to step the tape transmitter until such time as all of its conditions, as signified by five marking and/or spacing impulses in any order has been impressed on the associated relay tubes, these control tubes are conditioned by and under the control of the fifth and sixth distributor tubes 79 and 80 for the control tubes 161 and 162, whereas the control tubes 163 and 164 associated with the "B" tape transmitter 152 are conditioned by and under the control of the tenth tube 84 and the first tube 75. The fact that the fifth tube 79 partly initiates the action of these control tubes will not result in a stepping of the tape prior to the conditioning of the relay tube associated with the distributor tube 79 and the fifth code impulse, as signified by the contact 267, inasmuch as the operation of the relay tube and distributor tube will be substantially instantaneous, whereas it is necessary for tape stepping that the two tubes cooperate to cause such condition because of the length of time necessary for the actual stepping operation.

Referring now to the drawings and especially Figs. 3 and 4 thereof, and assuming that the distributor tubes 79 and 80 are not operating or firing, the voltage of grid 204 of the control tube 161 will be zero and this tube will be conducting. Such zero condition on the control grid 204 may be traced from positive grounded battery 26, over the conductor 27, through the resistor 92 associated with the tube 79, through the resistor 141, and over the conductor 142, through resistor 207, over the conductor 148, and over the conductor 119 to negative grounded battery 121. A second circuit may also be traced which instead of going through the resistor 92 associated with the tube 79, passes through the resistor 92 associated with the tube 80 and through the resistor 143 to the conductor 142. As a result of such circuits, as just described, the grid voltage of the tube 161 will be zero and this tube will conduct over a circuit which may be traced from grounded positive battery 26, over the conductor 27, over the conductor 203 and through the resistor 202 to the anode 201, and through the tube 161 to the cathode 211 and to ground at 212.

Under the condition just described with the distributor tubes 79 and 80 not firing and with the tube 161 conducting, the control tube 162 will not be conducting because the control grid 227 thereof will be biased negatively. The reason for such negative bias at this time is because of the potential drop across the resistor 202 at the time that the tube 161 is conducting. The circuit for controlling the bias of the grid of the tube 162 may be traced from negative grounded battery 121, over the conductor 119, over the conductor 148, over the conductor 223 and through the resistor 224, through the resistor 221, over the conductor 219, through the resistor 202, over the conductor 203 to the common conductor 27, over the common conductor 27 to positive grounded battery 26. As just mentioned, because of the potential drop across the resistor 202 while tube 161 is conducting, the grid 227 of tube 162 will be biased negatively and this tube will not conduct.

Let us now assume that the distributor tubes 75 to 78, inclusive, and their associated relay tubes have fired and been conditioned, respectively, and that the distributor tube 79 is firing at the present time. Under this condition the IR drop across the resistor 207 is less than that previously described and the voltage impressed on the grid 204 of the control tube 161 is at cutoff value or biased negatively. Under this condition the tube 161 will no longer be conducting inasmuch as in such triode tubes the conducting is directly under the control of the grid. Under the condition of the control tube 161, not conducting, the potential drop across the resistor 202 will not be as great and the voltage impressed on the control grid 227 of the tube 162 will be altered to such an extent, over the circuit previously traced for said control grid impressed voltage, that the tube 162 will become conducting. At this time a circuit may be traced from grounded positive battery 192 associated with the socket 181, over the conductor 191 to the No. 7 contact point of the socket to the No. 7 contact point of the plug 261, over the conductor 273 and through the winding of the solenoid 272, over the conductor 274, through the switch 276 which is now closed, over the conductor 277 to the No. 6 contact point of the plug 261 to the No. 6 contact point of the socket 181, over the conductor 189 to the anode 190 of the tube 162, through the tube which is now conducting to the cathode 228, and to ground at 229. Thus, under this condition the energized solenoid 272 will cause operation of mechanism to step the tape in order that a new codal combination may be presented to the tape sensing mechanism. It is to be understood, as is well known in the art, that during the tape stepping operation mechanism is provided for withdrawing the tape sensing members from perforations in the tape, previously sensed.

As previously described, the control tubes 161 and 162 are under the joint control of the distributor tubes 79 and 80. Likewise, as previously described, after the distributor tube 79 has fired it will condition the succeeding tube 80 for firing which, when that occurs, causes the extinguishment of the preceeding tube 79. Therefore, assuming now that the tube 79 is no longer firing but instead the tube 80 is firing, a similar circuit and condition may be traced for causing the tube 161 to be nonconducting, the tube 162 to be conducting, and the solenoid 272 to be energized, The joint control of these two tubes for causing the tape stepping operation is necessary because of the duration of time consumed in the tape stepping operation.

It is to be remembered that condensers 214 and 218 were described as being between the cathode and grid of the control tubes 161 and 163. Such condensers have been provided because, as previously described, the operation of the distributor tubes is substantially instantaneous and, therefore by providing these condensers an abrupt application of voltage to the solenoid 272 may be prevented. Thus, the voltage impressed thereto will be somewhat smoothed out in order to achieve more satisfactory operation thereof.

*Transmitting station*

The operation of the transmitting station, as disclosed in Figs. 3, 4, and 5 of the drawings, has been described in detail with respect to the various operations thereof. Reiterating briefly the various operations and apparatus described above, it has been seen that the standard frequency generator 21 generates a standard frequency controlled within narrow band limits which is in the form of a sine wave. This voltage is then amplified and rectified by means of the pulse generator exemplified generally by the tubes 22, 23, and 24, to initiate a positive pulse, such as shown at 63 in Fig. 10, which is timed in an invariable succession. The electronic distributor, as exemplified by the thyratron tubes 75 to 84, inclusive, when once started operates in timed succession with the positive pulses generated by the pulse generator. Likewise, it has been described how the tubes operate or fire through the conditioning by the preceding tube and upon such firing causes the extinguishment of that preceding tube.

A pair of tape transmitters are provided which have their sensing contacts connected to one element each of a plurality of relay tubes. Another element of the relay tube is conditioned by the output of an individual distributor tube to which it is connected so that a particular relay tube will conduct or not conduct depending on the joint operation of the associated distributor tube and the tape sensing contact, depending also on whether the contact is in marking or spacing condition.

A transmitting tube is provided, as described, which is under the control of the relay tubes, and which through successive operations or non-operations, depending on whether marking or spacing selections are set up in the tape sensing contacts, causes permutation code signals comprised of five impulses each to be transmitted over the signaling channel.

Thus, by a combination of the electronic apparatus described above, it is possible to transmit code signals over a signalling channel with no moving mechanical parts, with the exception of the tape transmitters.

*Receiving station*

By referring to Fig. 1, the various component parts of the receiving station have been shown diagrammatically and comprise, in general, a standard frequency generator, a corrector network, a phase shift network, an electronic receiving unit, a multiplex printer, and a start-stop printer operating in conjunction with a multiplex to start-stop converter. It is obvious that two multiplex printers could be utilized instead of a start-stop printer, but for description purposes, in order to show how start-stop apparatus could be adapted to such a system, the disclosed apparatus is included. It is to be noted that both the electronic receiver and the corrector network are connected to the signaling channel over which permutation code signals, originating from the transmitting station just described, are received.

The actual elements and circuits comprising the receiving station may be more readily seen by reference to Figs. 7, 8, and 9 arranged in the order shown in Fig. 6.

With respect to the electronic receiver, such apparatus may be broken down into component parts which include a pulse generator, an electronic distributor and selector mechanism which will be described hereinafter separately, as was done with respect to the component parts of the transmitting station.

Hereinafter, apparatus which is similar to and operates in the same manner as that described with respect to the transmitting station will be identified and reference made to such similarity only if a complete operational description is not necessary for an understanding of the persent receiving station.

*Standard frequency generator*

A standard frequency generator, indicated generally by the numeral 301, has been provided which operates similarly to the one disclosed with respect to the transmitting station and which is well known in the art and obtainable commercially. In view of the generator 301 being standard equipment, no further description thereof is necessary other than to say that such generator is preferably crystal controlled for a reason which will be described hereinafter. The output of the generator 301 is, as usual with such units, of a sine wave characteristic.

*Corrector network*

A corrector network which has been indicated generally by the numeral 302 is provided, which is connected to the signaling channel by means of a conductor 303 and to the standard frequency generator 301 by means of a conductor 304. The corrector network 302 is fully described in copending patent application, Serial No. 601,818, filed on June 27, 1945, in the name of R. G. Schuler, inventor, now Patent No. 2,495,946. It is not deemed necessary to describe further the operation of the corrector network inasmuch as such is described fully in the above-identified copending application. However, it is pertinent to note that the corrector network 302 operates to alter the standard frequency generated by the generator 301 by altering the impedance in the crystal circuit which controls the operation of such generator. Such frequency alteration results from a comparison of the incoming signals over the conductor 303 and standard frequency generated in order that the apparatus at the receiving station may operate synchronously with respect to the apparatus at the transmitting station.

*Phase shift network*

A phase shift network indicated generally by the numeral 306 has been provided and is connected to the standard frequency generator by means of a conductor 307 in order to manually shift the phase of the sine wave generated by the standard frequency generator 301, prior to its transmittal to the pulse generator to be described hereinafter. Inasmuch as such a phase shift network is well known in the art it is not deemed necessary to further describe its elements or operation.

*Pulse generator*

The pulse generator utilized at the receiving tation and which is exemplified by amplifier tube 308, rectifier tube 309 and triode tube 311 is connected to the phase shift network 306 by means of a conductor 310. As was described with respect to the transmitting station, a sine wave is transmitted over the conductor 310 to the left-hand element of the amplifier tube 308 from whence it is rectified and amplified similarly to that shown in progressive steps in Fig. 10, identically as was done at the transmitting station. Inasmuch as the elements and circuits in the present pulse generator are similar to and operate in the same manner as previously described, no further description appears to be necessary. It is to be noted however that a condenser 312 has been provided in order to increase the output of the pulse generator. The output of the triode tube 311 which has a similar wave characteristic to that shown as 63 in Fig. 10 is impressed over a conductor 313 to a common conductor 314 and thence is impressed on all of the control grids of the tubes of the electronic distributor.

*Electronic distributor*

An electronic distributor which is exemplified by the thyratron tubes 316 to 325, inclusive, has been provided which operates similarly to the electronic distributor described in detail previously. As mentioned above, the positive impulses of the output circuit of the triode tube 311 are transmitted over a conductor 313 to the common conductor 314 which leads to the control grids of all of the thyratron tubes 316 to 325, inclusive. A start key 327 is provided which upon the operation thereof will cause the tube 325 to fire, and thereafter results in the tubes 316 to 325, inclusive, firing successively. As each tube fires, it causes the extinguishment of the prior tube. Inasmuch as this operation has been fully described hereinbefore, it is not necessary to further describe either the elements or the operation of the electronic distributor other than to say that the output of the individual tubes upon firing is applied over a conductor 328 associated with each of the tubes. The output of the distributor tubes 316 to 325, inclusive, which is applied to the conductors 328 takes the form of a square wave, as shown at 329 in Fig. 11.

*Selector apparatus*

The selector apparatus includes, in general, a plurality of gas filled thyratron tubes 331 to 340, inclusive, and two similar gas filled sixth pulse tubes 342 and 343. A pair of relays indicated generally by the numerals 344 and 346 are provided which operate in a manner and for a purpose which will be described hereinafter.

With reference to the tubes 331 to 340, inclusive, the control grid 347 of each of these tubes is connected over a conductor 348 and through a condenser 349 to junction point 351 with the conductor 328, previously mentioned, leading from the output of the distributor tubes. The cathode 352 of each of these tubes is connected over a common conductor 353 to junction point 422 and thence to ground at 354. The screen grid 356 of each of the tubes is connected to a common conductor 357 which is connected by means of a conductor 358 to the one contact member 359 of a signaling input jack having the other contact element 361 connected over a conductor 362 to junction point 422 and thence to ground at 354. The input jack receives the signal impulses from the signaling channel. A line terminating resistor 363 is provided between the conductors 358 and 362 for a purpose which is well known to the telegraph art. The anodes 364 of the various selector tubes 331 to 335, inclusive, are connected through the individual load resistors 366 and over conductors 367 to 371, inclusive, respectively, to five contact points Nos. 1 to 5, inclusive, of a socket 373. A sixth contact point of the socket 373 is connected over a conductor 374 and through a resistor 375 to an anode 376 of the sixth pulse tube 343, previously mentioned. A seventh contact point of the socket 373 is connected over a conductor 377 and through a condenser 378 to junction point 379 and thence over conductor 381 to grounded positive battery 382. The condenser 378 is provided to prevent sparking of the contacts of the relays 344 and 346.

Inasmuch as the selector tubes 336 to 340, inclusive, are connected similarly to that described for the tubes 331 to 335, inclusive, with the exception that they terminate in a socket 383 instead of socket 373, no further description will be made thereof. It is to be noted, however, that the sixth contact point of the socket 383 is connected to the anode of the sixth pulse tube 342 and the seventh contact point is connected through the armature of the relay 344 to the positive battery 382.

The five tubes 331 to 335, inclusive, are responsive to the "A" channel incoming signals, whereas the tubes 336 to 340, inclusive, are responsive to the "B" channel signals, in a manner to be described hereinafter. The sixth pulse tube 342 operates in conjunction with the first distributor tube 316 whereas the sixth pulse tube 343 operates in conjunction with the sixth distributor tube 321.

In order to trace the connection between the tube 342 and the distributor tube 316, it is to be seen that the output circuit of the tube 316, which is impressed on the conductor 328 to junction point 351, is further impressed over a conductor 386 having a condenser 387 therein to a junction point 388 which is connected to a conductor 389 leading to the control grid 391 of the tube 342. The conductor 386 is joined at the junction point 388 through a resistor 392 to a conductor 393 which is connected through a resistor 394 to the control grid 396 of the tube 343, and which extends over conductor 397 and through a condenser 398 therein to the output circuit of the sixth distributor tube 321. The conductor 393 is also connected beyond junction point 400 by a conductor 399, over conductor 401 to a common conductor 402 which is connected by means of resistors 403 to the conductor 348 associated with the control grid of each of the tubes 331 to 340, inclusive. The conductor 401 is formed with the movable member 404 of a potentiometer, the resistor 406 of which is connected through resistor 407 to ground at 408. The opposite side of the resistor 406 of the potentiometer is connected through resistor 409 to a common conductor 411 which is connected over conductor 412 to grounded negative battery 413. The conductor 411 is connected over conductor 414 and through condenser 416 therein to the junction point 417, intermediate the resistor 407 and ground at 408.

The sixth pulse tube 343 has a screen grid 418 which is connected by means of conductors 419 and 421 to the conductor 362, thence to its junction point 422 with the conductor 353, and to ground at 354, as is the screen grid of the tube 342. The cathode 423 of the tube 343 is connected over conductor 424 to ground at 354.

The relay indicated generally by the numeral 346 is formed of a winding 426, one end of which is connected through resistor 427 and over conductor 428 to the conductor 374, previously mentioned, and the opposite side of the winding is connected over conductor 429 also to the conductor 374. It is to be noted, however, that the conductors 428 and 429 are connected to the conductor 374 on opposite sides of the resistor 375. A condenser 431 is provided between the conductors 428 and 429 immediately adjacent the winding 426. An armature 432 is provided for the relay 346 which is connected over conductor 433 to the conductor 377, previously described. When the relay 346 is in its de-energized condition the armature 432 is in engagement with a contact point 434 which is connected over a conductor 436 to a conductor 437 which is joined to the conductor 377, previously described, at junction point 379.

A plug 441 is provided which cooperates with the socket 373 and which has the contact points 1 to 5, inclusive, connected over conductors 442 to 446, inclusive, respectively, to one side of the windings of individual magnets 448 to 452, inclusive, respectively, of a multiplex printer indicated generally by the numeral 453. Such a multiplex printer may be similar to that disclosed in U. S. Patent No. 1,665,594, issued to H. L. Krum on April 10, 1928. The opposite side of the windings of the magnets 448 to 452, inclusive, are connected over a common conductor 454 to the No. 7 contact point of the plug 441. The No. 6 contact point of the plug 441 is connected over a conductor 456 to one side of the winding of a sixth magnet 457, the opposite side of which is connected to the common conductor 454.

A plug 458 is provided to associate with the socket 383, previously mentioned as being connected to the output circuits of the tubes 336 to 340, inclusive. The contact points of the plug 458 are connected by means of conductors to the multiplex side of a multiplex to start-stop converter indicated generally by the numeral 459. Such a multiplex to start-stop converter as contemplated in the instant description includes a start-stop side also which impresses the converted signals over a conductor 461 to a single magnet start-stop printer, indicated generally by the numeral 462. With respect to the instant apparatus described, the multiplex to start-stop converter 459 may be similar to that disclosed in U. S. Patent No. 2,382,596, issued on August 14, 1945, in the name of W. J. Zenner. Likewise, the single magnet start-stop printer 462 may be of the type disclosed in U. S. Patent No. 1,904,164, issued on April 18, 1933, to S. Morton et al.

*Operation of selector apparatus*

In the following description of the selector apparatus, it is to be assumed that the standard frequency generator 301, the corrector network 302, the phase shift network 306, and the pulse generator, as exemplified by tubes 308, 309, and 311 are functioning properly to present a positive pulse over the output circuit of the tube 311 to the conductor 313 and to the common conductor 314, similar to the positive pulse disclosed on the voltage curve 63 of Fig. 10. Likewise, it is to be assumed that this positive pulse, which is presented to the control grids of the electronic distributor tubes 316 to 325, inclusive, causes the operation of these tubes successively in a manner which has been described with respect to the electronic distributor at the transmitting station.

Likewise, it is to be assumed that the incoming signal from the signaling channel to the signal input jack is composed of a code signal having a spacing and marking characteristic for the first two impulses, as described with respect to the transmitting station.

Such input wave characteristics may be seen by reference to curve 463 in Fig. 11, wherein alternate spacing and marking impulses are shown. Through the use of the phase shift network 306, the distributor tubes can be caused to fire variably out of phase with respect to the incoming signals, as may be seen by comparing curves 329 and 463 of Fig. 11.

Assuming that the distributor tube 316 is in its nonoperating condition, a circuit may be traced from ground at 408, through the resistor 407, through the resistor 406 of the potentiometer, through the resistor 409, over the conductor 411, and over the conductor 412 to negative grounded battery 413. This circuit acts to bias the control grid 347 of the selector tube 331 negatively in such a manner that the tube will not fire.

Assuming now that the distributor tube 316 is firing in synchronism with the incoming spacing impulse, the control grid 347 will no longer be biased negatively, but because of the output of the distributor tube 316, will be raised to a zero voltage value.

The output of the various distributor tubes 316, etc., was previously described as having a characteristic such as that shown as 329 in Fig. 11. However, due to the condenser 349 being intermediate the grid 347 and the output circuit of the distributor tube, a positive impulse such as that shown on curve 464 of Fig. 11 will be presented to the control grid 347 instead of the square wave, to raise it to a zero value.

At the same time as the control grid 347 of the selector tube 331 is raised to zero voltage, the negative spacing condition which exists on the signaling channel will be impressed over the contact member 359, over the conductor 358, over the common conductor 357 to the screen grid 356 of the selector tube 331. Because, however, of the negative potential on the screen grid, the tube 331 will not fire even though the control grid was at a zero voltage. Thus, during a spacing condition on the signalling channel, the associated selector tube will not fire even though it receives a conditioning pulse from its associated distributor tube.

Inasmuch as the selector tube 331 does not fire, no electrical circuit can be traced over its output circuit through the resistor 366, over the conductor 367 to the No. 1 contact point of the socket 373 to the No. 1 contact point of the plug 441, and thence to the winding of the magnet 448 of the multiplex printer 453. Thus, during a spacing condition, at which time the associated selector tube does not operate or fire, the associated multiplex printer magnet likewise will not be energized. It is to be noted that after the distributor tube 316 ceases to operate, the control grid 347 of the selector tube 331 will no longer be at the zero voltage but instead will be reduced to a negative bias, as previously described for the nonoperating condition of the distributor tube 316.

It is to be noted, as has been described previously, that the output of the distributor tubes which have a square wave characteristic as shown as curve 329 of Fig. 11 is altered by means of the condensers 349 so as to assume a pulse characteristic, as shown by curve 464 of Fig. 11. Such a condition greatly enhances the operation of the apparatus because of the point selection which is possible. By this term is meant the fact that the conditioning impulse from the distributor tubes is almost instantaneous and thus will cause the operation of the selected selector tube when present concurrently at any point in the signal impulse. Such operation is extremely desirable because it no longer is necessary to rely on the signal impulse being present for a predetermined time and of sufficient volume in order for it to be received. This condition is particularly valuable when signaling conditions are poor and the received signal impulses are mutilated with respect to ideal signals as shown by curve 463 of Fig. 11. Under these conditions it is only necessary to have the conditioning pulse concurrent with the best portion of the signal impulse to insure proper operation. It is also to be noted that the point of selection, that is, the degree of building up of the pulse and its duration may be altered by altering the constants of the circuit.

As mentioned above, it is possible to shift the conditioning pulse from the distributor tubes so as to be concurrent with the best part of the signal impulse. Such shift may be made within the limits of the signal impulse interval, as shown by curve 463 of Fig. 11, by means of the phase shift network disclosed in block diagram in Fig. 1. It is to be seen by reference to Fig. 11 and by a comparison of curves 463 and 464 that the pulse is set at the midpoint of the signal interval in the present disclosure because under normal conditions the impulse is maximum at this point.

It might be mentioned that the corrector network designated 303 and disclosed fully in the above-mentioned R. G. Schuler patent application will tend to automatically set the pulse with respect to the signal impulses. Through the operation of these networks the distributor and selector tubes will operate in optimum phase with respect to the incoming signal impulses.

Assuming now that the distributor tube 317 is firing in synchronism with the incoming marking impulse from the signaling channel, described as being the second impulse of the code signal, the control grid 347 of the selector tube 332 will be reduced to zero voltage in a manner as just described with respect to the selector tube 331. However, inasmuch as the marking condition on the signaling channel is a zero condition, as previously described, there will be no negative bias on the screen grid 356 thereof from the conductors 358 and 357. Thus, under this condition both the control grid 347 and the screen grid 356 will have a zero voltage value and under such a condition the selector tube 332 will fire.

Under such condition an electrical circuit may be traced from ground at 354 over the conductor 353 to the cathode 352 of the selector tube 332, through the tube which is now firing to the anode 364, through the resistor 366, and over the conductor 368 to the No. 2 contact point of the socket 373 to the No. 2 contact point of the plug 441, over the conductor 443, through the winding of the magnet 449, through the common conductor 454 to the No. 7 contact point of the plug 441 and to the No. 7 contact point of the socket 373, over the conductor 377, over the conductor 433, through the armature 432 of the relay 346 (now de-energized), through the contact 434 associated with the armature and over the conductor 436, over the conductor 437 to the junction point 379, and over the conductor 381 to grounded positive battery 382. It might be noted that because of the condenser 378 in the conductor 377, a circuit may not be traced directly over the conductor 377 to the battery 382 but must be traced through the armature 432 of the relay 346. Once the selector tube 332 starts to fire its characteristic will be similar to that as shown as curve 466 of Fig. 11. The tube will continue to fire and hold the associated magnet 449 in an energized condition until such time as it is extinguished, as will be described hereinafter, despite the fact that the tube 317 is no longer firing and the control grid 347 is again biased negatively.

We have now observed the condition of the selector tubes and associated printer magnets during the reception of the first two impulses on the "A" channel. Let us now assume that the remaining three impulses representing the code signal, which may be either marking or spacing, have been received and that the first impulse of the code signal on the "B" channel is now being received. Under this condition the sixth distributor tube 321 will fire in a manner which has been previously described. Prior to the firing of the tube 321, the control grid 396 of the sixth pulse tube 343 is biased negatively by a potential developed across the potentiometer at point 404 and which may be traced through the movable member 404 of the potentiometer, over the conductor 401, over the conductor 399 to the junction point 400, over the conductor 393 and through the resistor 394. The biasing potential developed across the potentiometer results from a circuit which may be traced from negative grounded battery 413, over the conductor 412, over the conductor 411, through the resistors 409, 406, and 407 to ground at 408. However, upon the firing of the distributor tube 321, a square wave output is impressed over the conductor 328 to the junction point 351 and thence to the condenser 398. Because of the inclusion of the condenser 398 in the circuit, the square wave will not pass therethrough but instead a positive pulse equal approximately to the absolute value of the negative bias, such as shown on curve 464, Fig. 11, will pass through the condenser 398, over the conductor 397 to raise the control grid voltage to a zero value. As previously mentioned, the screen grid 418 of the tube 343 is connected over conductors 419, 421, and 362 to ground at 354. Thus, the tube 343 will now conduct inasmuch as both of the grids are at a zero voltage value.

Upon firing of the tube 343, an electrical circuit may be traced from ground at 354, over the conductor 424 to the cathode 423 of the tube, through the tube to the anode 376, over the conductor 374 and through the resistor 375 therein to the No. 6 contact point of the socket 373 to the No. 6 contact point of the plug 441, over the conductor 456 and through the winding of the magnet 457 of the multiplex printer 453, over the common conductor 454 to the No. 7 contact point of the plug 441 to the No. 7 contact point of the socket 373, over the conductor 377, over the conductor 433, through the armature 432 of the relay 346 to the contact point 434 in engagement therewith, through the conductor 436 and over the conductor 437 to junction point 379, and over the conductor 381 to positive grounded battery 382. Under this condition the magnet 457 will be energized causing the printing of the character which has been selected by the permutable setting of the impulse magnets 448 to 452, inclusive.

A second electrical circuit may also be traced due to the firing of the tube 343, through the tube from ground to the anode 376, over the conductor 374, over the conductor 428 and through the resistor 427, through the winding 426 of the relay 346, over the conductor 429, over the conductor 374 and through the plug and magnet 457 at the multiplex printer, as just described. However, the energization of the relay 346 will not be instantaneous because of the time delay network, as exemplified by the resistor 427 and the condenser 431 which has been inserted between the voltage source and the relay winding 426. Such a time delay network has been provided in order to insure energization of the printing conditioning magnet 457 of the multiplex printer 453 prior to the energization of the relay 346. Due to the time delay network the winding 426 of the relay 346 will be energized after the energization of the magnet 457 resulting in the armature 432 being attracted thereto out of engagement with the stationary contact point 434. Due to the armature 432 no longer engaging its contact point 434, it is no longer possible to trace an electrical circuit from positive grounded battery 382, through the armature 432 and the associated contact point 434 and over the conductor 377 to the conductor 454 at the multiplex printer 453. Thus, the No. 2 magnet 449 which has previously been described as being energized over this circuit will become de-energized. During this condition any of the selector tubes 331 to 335, inclusive, which have been operating, such as shown for instance in the curve 466 of Fig. 11 with respect to selector tube 332, will be extinguished due to the energization of the relay 346. Inasmuch as the control tube 343 is under the control of the output voltage of the distributor tube 321 and the relay 346, its conducting period will be as shown on curve 468 of Fig. 11. Thus, it may be seen that the character which has been selected, depending on the marking or spacing condition of the magnets 448 to 452, inclusive, will be printed upon the operation of the magnet 457 and thereafter all of these magnets which have been energized, including the magnet 457, will be de-energized due to the operation of the relay 346 under the control of the tube 343. Thereafter, these magnets are prepared for the next cycle of operation on the "A" channel after the selector tubes 336 to 340 have been conditioned due to "B" channel incoming impulses. As was previously mentioned, a relay 344 is provided which is under the control of the tube 342 operating in conjunction with the first distributor tube 316 and which acts similarly to the operation just described to extinguish the selector tubes operating in conjunction with the "B" channel to cause the extinguishment and preparation for another cycle of operation on the "B" channel equipment.

It is not deemed necessary to describe the operation of the multiplex to start-stop converter 459 and the operation of the single magnet start-stop printer 462 described as being connected to the "B" channel. It is pertinent to note, however, that magnets are provided in the multiplex to start-stop converter 459 which operate similarly to the magnets of the multiplex printer 453. The distinguishment between the operation of the two units is that instead of the magnets of the converter 459 directly controlling a printing operation, they instead control start-stop equipment for sending start-stop signals over the conductor 461 to the start-stop printer 462. The operation of such a converter may be fully understood by reference to the above-mentioned Zenner patent.

While the above-described system has incorporated the use of two channel multiplex transmission and apparatus utilized therewith, it is to be understood clearly that the present invention is not limited to two channel multiplex operation but instead may be altered, within the scope of the present invention, to incorporate a greater number of signaling channels.

It should be noted that because of the high speed attainable with the present apparatus and system it is possible, by increasing the elements utilized therein, to increase the number of message channels (transmitting and receiving apparatus) utilized. In the event that a small number of channels are being used, by switching in appropriate transmitting and receiving equipment and increasing the frequency, and thus the speed, of the standard frequency generator the electronic distributors will be speeded up and signaling can proceed at the same speed. Likewise, if the channels are reduced in number it is only necessary to switch out the equipment associated with those channels and reduce the frequency of the standard frequency generator in order to maintain a constant signaling speed for the remaining channels which is similar to that with the greater number of channels. Likewise the associated equipment, such as the tape transmitters at the transmitting station, the multiplex printer at the receiving station, and the multiplex to start-stop converter and start-stop printer also at the receiving station need not necessarily be of the type described but may be of any type which is available commercially and which may be utilized in such a system.

Although a specific embodiment of the invention has been shown and described, it will be understood that this embodiment is but illustrative and that various modifications may be made therein without departing from the scope and spirit of this invention.

What is claimed is:

1. In a telegraph receiver, a source of time division multiplex signals comprising on a single line signals from a plurality of channels, a plurality of electronic tubes assigned to each of the channels and adapted to be conditioned by received multiplex signal impulses therefrom, a continuously operating impulse generator, an electronic distributor comprising a plurality of tubes, means whereby said tubes operate successively and repeatedly one at a time in response to the successive impulses from said generator at the frequency of the line signals, said distributor operating to render conductive all of said conditioned electronic tubes assigned to one of the channels prior to rendering conductive said conditioned tubes assigned to any of the other channels, a recorder assigned to each of the channels responsive to said plurality of electronic tubes assigned thereto, and means under the control of said distributor for causing said recorders to make a record.

2. In a multiplex telegraph receiver, a source of multiplex signals comprising on a single line signals from a plurality of channels, a continuously operating impulse generator, an electronic distributor comprising a plurality of tubes, means whereby said tubes operate successively and repeatedly one at a time in response to the successive impulses from said generator at the frequency of the line signals, a plurality of groups of selector tubes, said tubes of each group being assigned to signals from one of said channels, each of said tubes being under the conjoint control of one of said distributor tubes and said source of multiplex signals, a plurality of recorders each one of which is under the control of one of said groups of selector tubes, and means controlled by said distributor for causing said recorders to record characters.

3. In a multiplex telegraph receiver, a source of multiplex signals comprising on a single line signals from a plurality of channels, a plurality of groups of selector tubes, said tubes of each group being assigned to signals from one of said channels and adapted to be conditioned for operation by the received multiplex signals, a continuously operating impulse generator, an electronic distributor comprising a plurality of tubes, means whereby said tubes operate successively and repeatedly one at a time in response to the successive impulses from said generator at the frequency of the line signals for operating conditioned ones of said selector tubes, individual means under the control of each of said groups of selector tubes to make a record, and means controlled by said electronic distributor for causing operated ones of said selector tubes in a group to be extinguished after said means to make a record has been controlled by said group.

4. In a multiplex telegraph receiver, a source of multiplex signals comprising on a single line signals from a plurality of channels, a plurality of groups of selector tubes, said tubes of each group being assigned to signals from one of said channels and adapted to be conditioned for operation by the received multiplex signals, a continuously operating impulse generator, an electronic distributor comprising a plurality of tubes, means whereby said tubes operate successively and repeatedly one at a time in repsonse to the successive impulses from said generator at the frequency of the line signals for operating conditioned ones of said selector tubes, individual means under the control of each of said groups of selector tubes to make a record, and means controlled by said electronic distributor for causing operated ones of said selector tubes in a group to be extinguished after said means to make a record has been controlled by said group.

5. In a multiplex telegraph receiver, a source of multiplex signals comprising on a single line signals from a plurality of channels, a plurality of groups of selector tubes, each tube having at least an anode and two grids, said tubes of each group being assigned to signals from one of said channels and one of said grids of each of said tubes being biased in accordance with the multiplex signals, a continuously operating impulse generator, an electronic distributor comprising a plurality of tubes, means whereby said tubes operate successively and repeatedly one at a time in response to the impulses from said generator at the frequency of the line signals, the other of said grids of said selector tubes being biased by a corresponding one of said distributor tubes to cause conditioned ones of said selector tubes to be rendered conductive, and individual recording means under the control of each of said groups of selector tubes and connected to said anodes thereof to make a record.

THEODORE A. HANSEN.

REFERENCES CITED

The following references are of record in the file of this patent:

UNITED STATES PATENTS

| Number | Name | Date |
|---|---|---|
| 2,210,577 | Fitch | Aug. 6, 1940 |
| 2,292,169 | Spencer | Aug. 4, 1942 |
| 2,400,574 | Rea | May 21, 1946 |
| 2,412,642 | Wilkerson | Dec. 17, 1946 |
| 2,456,825 | Fitch | Dec. 21, 1948 |
| 2,465,355 | Cook | Mar. 29, 1949 |